United States Patent [19]
Boie et al.

[11] Patent Number: 5,847,690
[45] Date of Patent: Dec. 8, 1998

[54] INTEGRATED LIQUID CRYSTAL DISPLAY AND DIGITIZER HAVING A BLACK MATRIX LAYER ADAPTED FOR SENSING SCREEN TOUCH LOCATION

[75] Inventors: Robert Albert Boie, Westfield; Richard Alan Gottscho, Maplewood; Allan Robert Kmetz, Chatham; Richard H. Krukar, New Providence; Po-Yen Lu, Mendham; John Robert Morris, Jr., Cranbury, all of N.J.

[73] Assignee: Lucent Technologies Inc., Murray Hill, N.J.

[21] Appl. No.: 547,636

[22] Filed: Oct. 24, 1995

[51] Int. Cl.⁶ .............................. G09G 3/36; G09G 5/00
[52] U.S. Cl. .......................................... 345/104; 345/174
[58] Field of Search .................................... 345/104, 173, 345/174, 179; 359/54, 68; 349/110

[56] References Cited

U.S. PATENT DOCUMENTS

| | | | |
|---|---|---|---|
| 4,224,615 | 9/1980 | Penz ........................................ | 345/174 |
| 4,290,061 | 9/1981 | Serrano .................................. | 345/174 |
| 4,363,029 | 12/1982 | Piliavin et al. ......................... | 345/104 |
| 4,529,968 | 7/1985 | Hilsum et al. ......................... | 345/104 |
| 4,893,071 | 1/1990 | Miller .................................... | 324/660 |
| 4,893,115 | 1/1990 | Blanchard .............................. | 345/174 |
| 5,083,118 | 1/1992 | Kazama ................................. | 340/706 |
| 5,159,323 | 10/1992 | Mase et al. ............................ | 345/104 |
| 5,300,927 | 4/1994 | Arai et al. .............................. | 345/157 |
| 5,337,353 | 8/1994 | Boie et al. ............................. | 379/388 |
| 5,353,135 | 10/1994 | Edwards ................................ | 345/87 |
| 5,534,892 | 7/1996 | Tagawa .................................. | 345/104 |
| 5,550,659 | 8/1996 | Fujieda et al. ......................... | 345/104 |
| 5,568,292 | 10/1996 | Kim ....................................... | 345/104 |
| 5,592,197 | 1/1997 | Tagawa .................................. | 345/104 |
| 5,606,194 | 2/1997 | Lebrum et al. ........................ | 349/110 |
| 5,677,744 | 10/1997 | Yoneda et al. ......................... | 345/104 |

FOREIGN PATENT DOCUMENTS

| | | |
|---|---|---|
| 0622754 | 4/1994 | European Pat. Off. . |
| 2134760 | 2/1984 | United Kingdom . |

OTHER PUBLICATIONS

"Lithography", by D.A. McGillis, Chapter Seven, pp. 267–301, *VLSI Technology*, 1983 by Bell Telephone Laboratories, Incorporated, edited by S.M. Sze.

*Primary Examiner*—Jeffery Brier
*Assistant Examiner*—Paul A. Bell
*Attorney, Agent, or Firm*—Patricia A. Verlangieri

[57] ABSTRACT

A unitary display and sensing device integrates liquid crystal display module elements of a liquid crystal display module for detecting input on a flat panel display screen with the capability for digitizing the detected inputs. In accordance with an illustrative embodiment of the present invention, display elements of a liquid crystal display module are modified to sense input on the display screen. An electrical signal is applied to modified display elements of the liquid crystal display module so that contact with a surface portion of the display screen produces an output signal indicative of its location. The integrated display and sensing device is active matrix addressed for finger input, but may also incorporate display systems for active pen input.

13 Claims, 7 Drawing Sheets

DISPLAY PANEL
(PRIOR ART)

LIQUID CRYSTAL DISPLAY MODULE
(PRIOR ART)

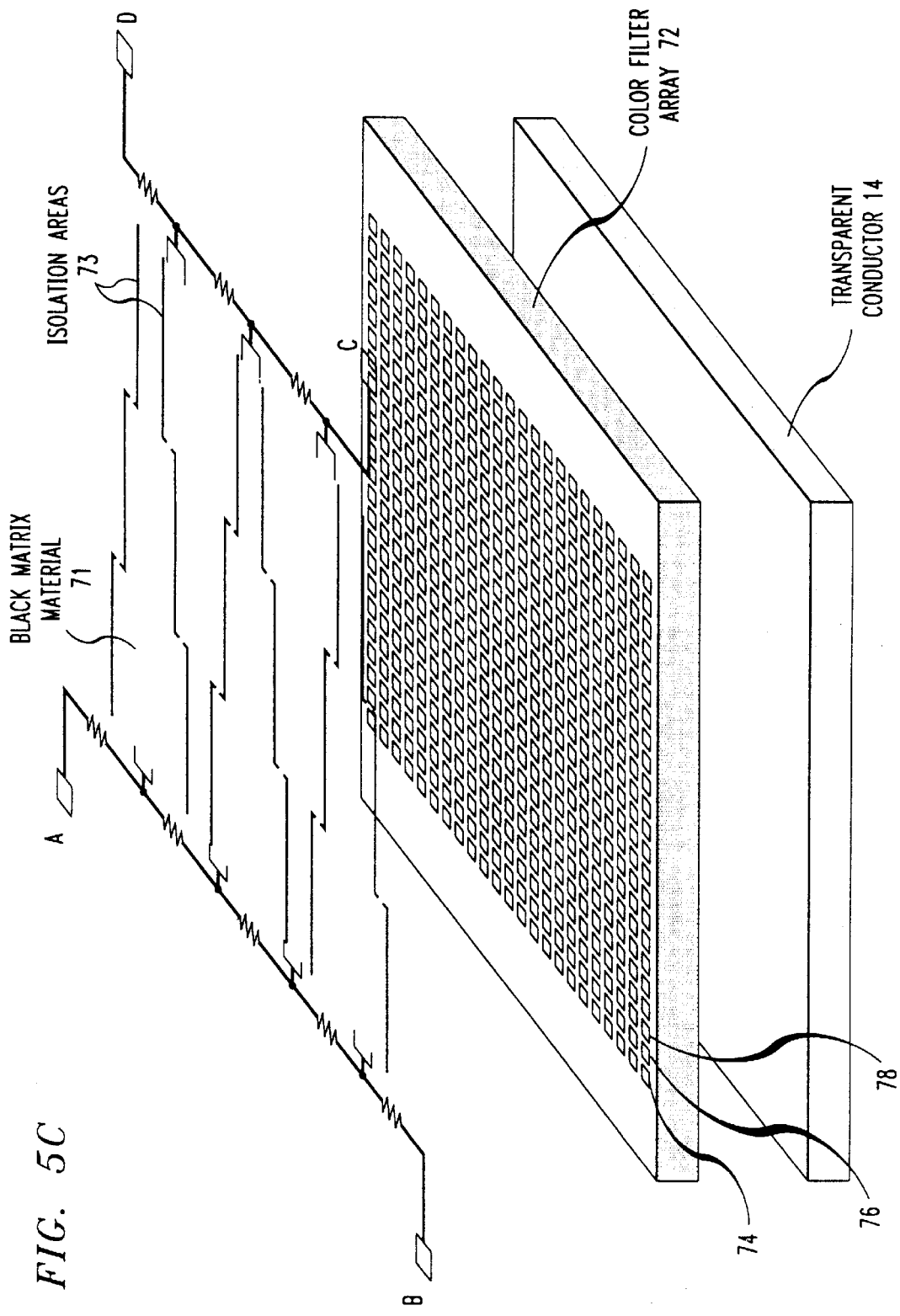

INTEGRATED LIQUID CRYSTAL DISPLAY AND DIGITIZER HAVING A BLACK MATRIX LAYER ADAPTED FOR SENSING SCREEN TOUCH LOCATION

BACKGROUND OF THE INVENTION

1. Field of the Invention

The present invention relates generally to electronic liquid crystal display panels and, more particularly, to display panels with an integrated digitizer.

2. Description of the Prior Art

Liquid crystal display panels are used in many electronic data handling devices, including lap-top computers, personal digital assistants, personal organizers, and point-of-sale terminals. These flat panel display systems typically incorporate the capability of inputting information directly onto the display screen by pointing or writing with a finger or a non-inking pen. For example, a finger may be used to push a "soft" button that is displayed on the screen or a non-inking stylus can be used to sign one's name and have it captured and displayed electronically.

The structure of a typical prior art liquid crystal display panel is shown in FIG. 1A. In this structure, the separate functions of sensing the location of finger or pen input on the display screen and the subsequent depiction of that information, are performed by individual display components which are packaged together. The location sensing components of the display panel comprise a cover glass to which the finger or pen is contacted and a digitizer or transducer which functions to produce signals indicative of the location of the pen, finger or other input to the display screen. A variety of different types of digitizers are used to sense the location of information input on the cover glass such as infra-red, acoustical, optical, capacitive, resistive or inductive methods. These transducers may be affixed to the flat panel display architecture either above (shown in FIG. 1A) or below (not shown) the liquid crystal display module and polarizers.

The display components of the typical display panel shown in FIG. 1A, comprise a light reflecting and/or emitting back surface and two polarizers, between which is located a liquid crystal display module. The polarizers function to select one component of light reflected off the back surface and through the liquid crystal display module so as to make the viewed surface of the cover glass appear bright when the cell (or pixel) is off or dark when the cell (or pixel) is on, when operated in the normally white mode. (The reverse is true in the normally dark mode).

One display component of a typical liquid crystal display panel is the liquid crystal display module shown in FIG. 1B. This liquid crystal display module is comprised of several layers of conducting and electro-optic materials called liquid crystal display module elements. Liquid crystal display module elements include a color filter plate with black matrix material deposited on one surface to block light and below which is located a color filter array, liquid crystal material and an active matrix plate upon which an array of thin film transistors and picture elements (pixels) have been formed and which functions to cause the liquid crystal material to display shapes of variable opacity in response to an electric field created between two transparent conductors. For purposes of this description and the appended claims, liquid crystal display module elements of the liquid crystal display module are bonded together to form a singular display panel component.

There are problems associated with interleaving separate digitizers in display panels, as described above. In particular, such displays exhibit increased glare from ambient light as a result of air-gaps which arise when the digitizer is affixed to the display components which comprise the display panel. Additionally, fabrication costs and complexity are increased by the need for separate dedicated sensing hardware, as well as requirements that the sense locations be interfaced with the display hardware for properly associating input to the appropriate display elements.

Thus, it would be useful for both the transducer and liquid crystal display module to be integrated in a single display panel component so as to eliminate the need for an "add-on" digitizer. Such an arrangement would reduce cost and increase reliability by utilizing the same processing steps and materials.

SUMMARY OF THE INVENTION

The present invention provides a highly advantageous approach for flat panel display systems by incorporating a liquid crystal display module which integrates in a single display panel component, liquid crystal display module elements for performing the separate functions of sensing the location of finger or pen input on the display screen with the capability to depict such information. As such, manufacturing complexity, and cost are reduced and reliability increased by utilizing liquid crystal display module elements of the liquid crystal display module hardware to perform both the display and digitizing functions, instead of separate components.

In accordance with an illustrative embodiment of the present invention, the integrated display and sensing device is active matrix addressed for finger input. However, it is contemplated that integrated display and sensing devices may also incorporate display systems for active pen input.

In an illustrative embodiment of the present invention, one or more liquid crystal display module elements of the liquid crystal display module are adapted for sensing the location of an input on the display screen. Modified liquid crystal display module elements may include but are not limited to the light shielding layer for the color filters, the common voltage element and the color filter plate.

With this approach a voltage pulse is applied to an array of sensing electrodes and a pair of resistor strings comprising one or more of the modified liquid crystal display module elements. When an object is brought in close proximity to the display screen capacitive coupling occurs between the object and sensing electrodes. The capacitive coupling causes current flow from the sensing electrodes into the resistor strings, which is indicative of the location on the display screen of the sensed input.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

FIG. 5C is a perspective view of the layers which comprise the capacitive touch sensor pattern and resistive strings in the black matrix layer of a liquid crystal display;

DETAILED DESCRIPTION

Figure 1A:
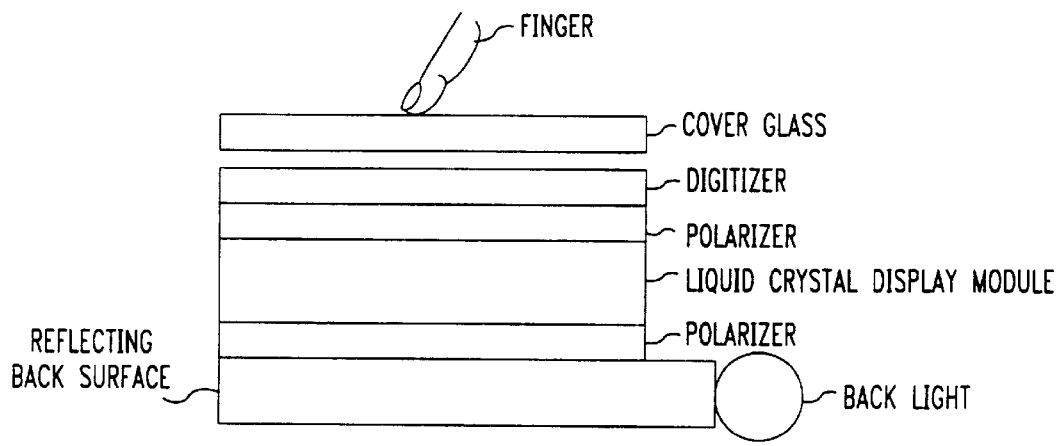
FIG. 1A shows a schematic illustration of a prior art front plane digitizer.
Figure 1B:
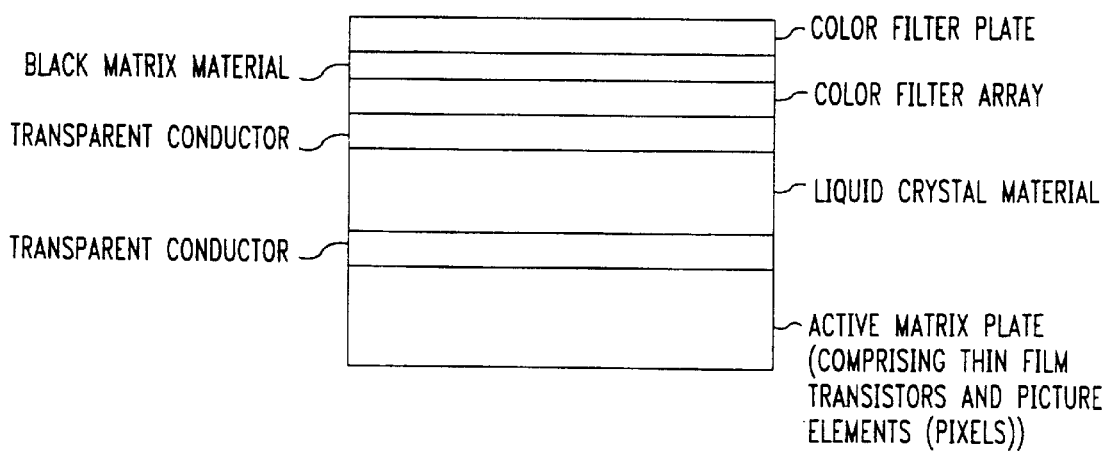
FIG. 1B shows a schematic illustration of a typical prior art liquid crystal display module.
Figure 2:
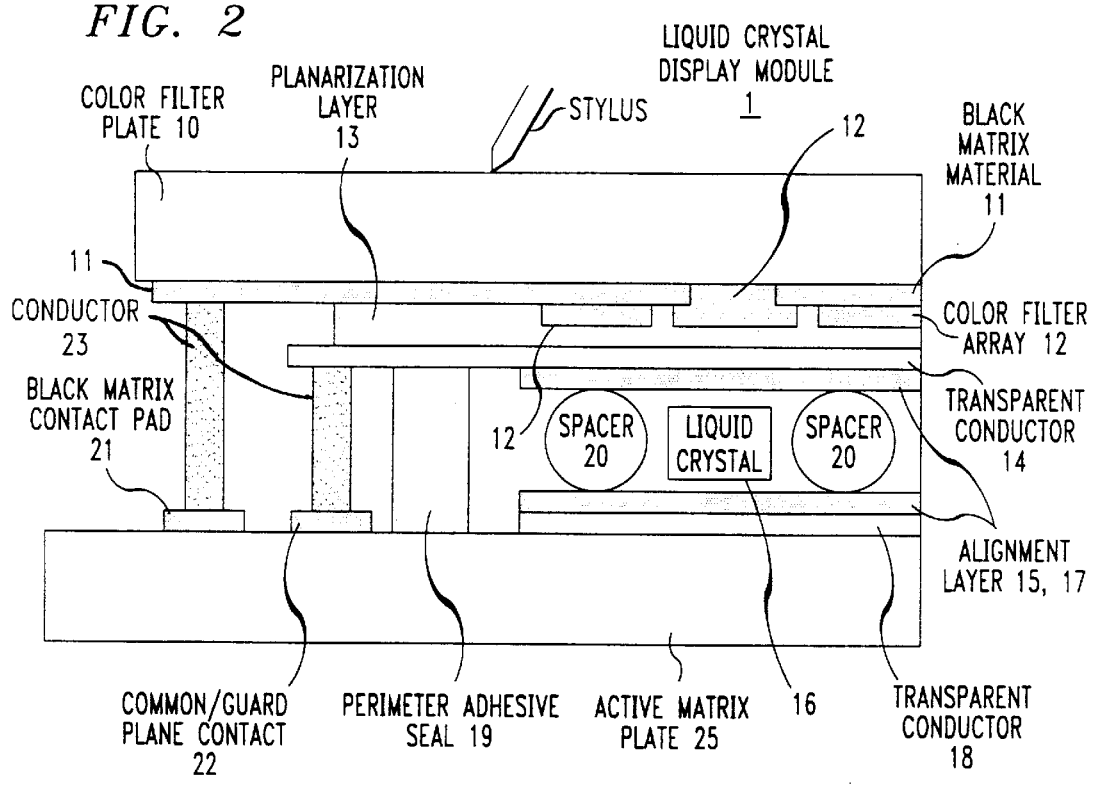
FIG. 2 illustrates a cross-sectional cut of a section of a liquid crystal display module showing the liquid crystal display module elements used for detecting input on a flat panel display screen.

Referring to the active matrix addressed liquid crystal display module 1 shown in FIG. 2, black matrix material 11 and transparent conductor 14 are also advantageously employed in capacitively sensing pen or finger input on the flat panel display screen. With this approach, transparent conductor 14 and black matrix material 11, which were previously used just for operating the liquid crystal display module, in particular the common voltage element of the liquid crystal display, and as a light shielding layer for the color filters, are adapted for sensing the location of an input on the display screen.

The liquid crystal display module 1 used for displaying responses to an input on a flat panel display screen, has a glass color filter plate 10, spaced from an active matrix plate 25, with the area in between containing several layers of conductive and electro-optic materials. On an interior surface of color filter plate 10, there is a patterned layer of black matrix material 11 comprising an anti-reflective, absorbing film. Black matrix material 11 can also be conducting (e.g. Cr). Below black matrix material 11 is a color filter array 12, containing separate red, green and blue color filters, and a planarization layer 13, which is an overcoating that is used to reduce contamination of the liquid crystal material 16 and planarize the surface. If liquid crystal display module 1 is not a color display, color filter array 12 is not present. Located above active matrix plate 25 and below planarization layer 13 are two transparent conductors 14, 18 and alignment layers 15, 17.

A perimeter adhesive seal 19 confines liquid crystal material 16 to the area remaining between transparent conductors 14, 18 and alignment layers 15, 17. Spacers 20, including a suitable electrically insulative material are located in liquid crystal material 16. Spacers 20 prevent thickness variations in the liquid crystal cavity and prevent distortions to display module 1. In a peripheral area of display module 1, black matrix material 11 and transparent conductor 14 are electrically connected to active matrix plate 25 through black matrix contact pad 21 (through conductor 23) and common/guard plane contact 22, respectively. These electrical contacts to black matrix material 11 and transparent conductor 14 could also be made through contact pads formed on color filter plate 10 (not shown). Active matrix plate 25 has a construction in which switching elements comprised of an array of thin film transistors (not shown) are interconnected to an array of cells called picture elements or pixels (not shown) via gate, row, data or column lines.

Figure 3A:
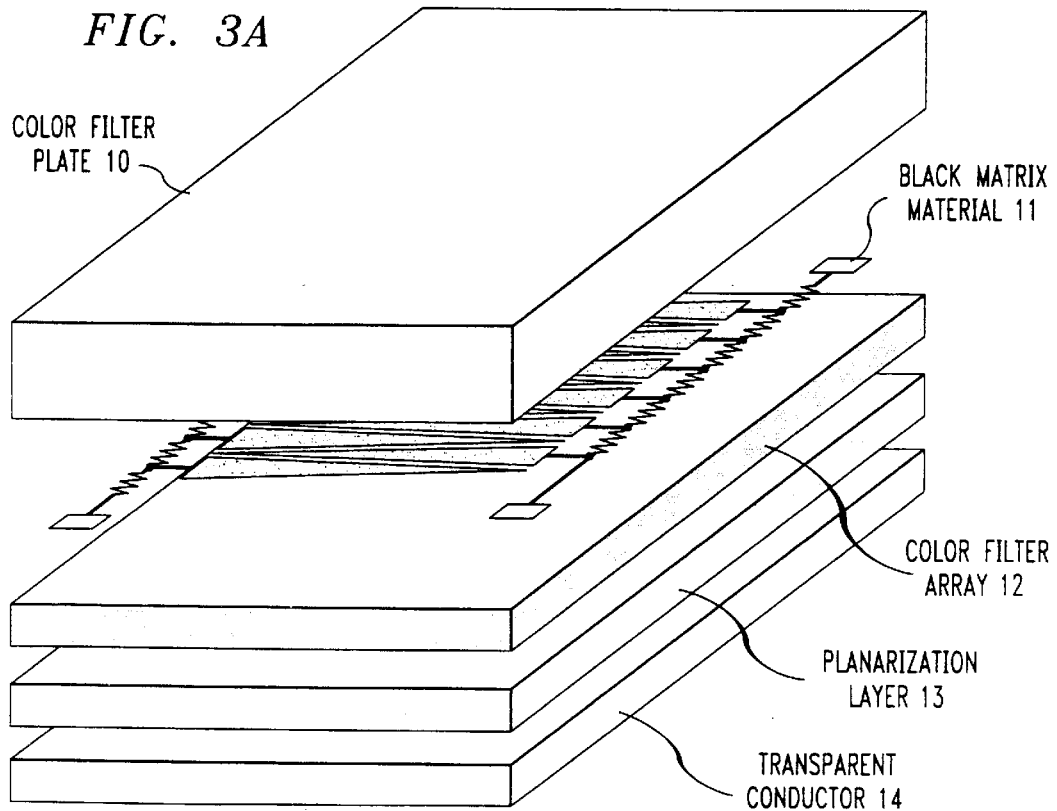
FIG. 3A is a perspective view of the layers of the liquid crystal display module which are used for detecting input on a flat panel display screen.
Figure 3B:
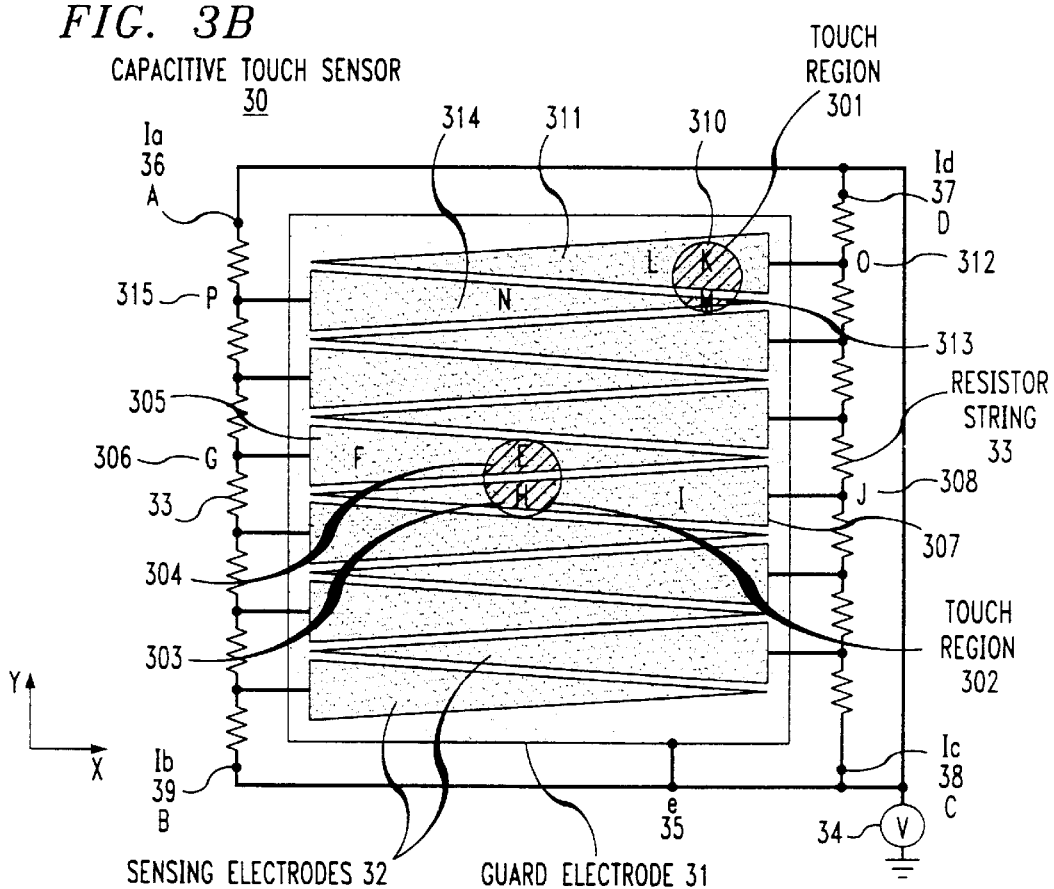
FIG. 3B shows a top view of these same layers which comprise the capacitive touch sensor.

For the operation of the display functions liquid crystal display module 1, transparent conductor 14 (which also acts as guard electrode 31 for the capacitive touch sensor of FIG. 3B) is an unpatterned film of transparent conductive material, usually 100–200 nm of deposited indium tin oxide. This conductor serves as a common voltage element for all the pixels on active matrix plate 25. A voltage waveform is applied to transparent conductor 14, at frequencies which create an electric field across liquid crystal material 16 causing the areas covered by picture element electrodes to display shapes of variable opacity. Transparent conductor 14 is driven with a square voltage waveform to reverse the polarity of the voltage that appears across the liquid crystal material 16. It is well known that dc voltages can degrade the characteristics of liquid crystal material and shorten the lifetime of a display. Alternative drive schemes can also be used where transparent conductor 14 is not driven, but kept at a constant potential while the voltages on the pixels are reversed and switched through a corresponding frequency range.

Black matrix material 11 of liquid crystal display module 1, is a patterned material which is employed to prevent light from impinging on the thin film transistors used to switch the pixels on the active matrix plate 25. In addition, black matrix material 11 is also used to cover the edges of the pixel electrodes where distortions in the electric field applied across a liquid crystal display, produce distortions in liquid crystal alignment and therefore degradation in the display contrast ratio.

In a one embodiment of this invention, transparent conductor 14 and black matrix material 11, as described above and depicted in FIG. 3A, are driven with a square wave voltage pulse. When a finger or non-inking pen is brought in close proximity to the display screen, the capacitive coupling to ground is altered and the magnitude of the displacement current is correspondingly modified, and is indicative of the location on the display screen of the sensed input.

Referring to FIG. 3B, capacitive touch sensor 30 includes conducting sensing electrodes 32, formed in black matrix material 11 (FIG. 3A), and a conducting guard electrode 31 (which is also the transparent conductor 14 of FIG. 3A). Planarization layer 13 is not shown but it is needed to prevent conducting guard electrode 31 from shorting together all conducting sensing electrodes 32. To facilitate formation of an electrostatic field, resistive strings 33 are coupled to each sensing electrode 32. The shape, size, and materials of sensing electrodes 32 are dependent on the application, hence, the triangular (backgammon) pattern depicted in FIGS. 3A and 3B, are not essential. The key ingredient is to have strips of conducting material of a size sufficient to determine the X and Y locations of an implement touching the display screen, that are driven in parallel by a voltage source 34.

Capacitive touch sensor 30, shown in FIG. 3B, senses the proximity and position of a finger relative to the sensing surface by measuring the capacitance between the finger and surface in a position dependent way. The measurement relies on the fact that when a finger is brought near an excited electrode, a measurable displacement current flows between them.

An array of interlocking sensing electrodes 32 are used to sense finger position in addition to touch. Each electrode set is interconnected via a suitably valued resistor string 33. Sensing electrodes 32 are shielded from below by guard electrode 31 and are covered from above by the glass substrate to prevent contact with the finger. Covering sensing electrodes 32 with the glass plate greatly enhances the sensitivity with which finger positions can be detected. The four ends of resistive strings 33 at nodes A 36, B 39, C 38, and D 37 and guard electrode 31 are driven by voltage source 34. Currents Ia, Ib, Ic, and Id are also measured flowing into the ends of resistive strings 33 from voltage source 34. Only relatively small currents flow into resistive strings 33, since the nearby display element (guard electrode 31) is driven in unison by voltage source 34. Nevertheless, when a finger approaches the display screen, the currents Ia, Ib, Ic, and Id at nodes A 36, B 39, C 38, and D 37 are increased. The finger provides one path for current to flow back to the sensor circuit common, node E 35, or ground through a winding path. The return circuit includes the capacitive coupling between the finger tip and sensing electrodes 32, a resistive path through the body for the hand held device, and capacitively from the hand to the sensor circuit common, at node E 35. The capacitance between the finger tip and sensing electrodes 32 is the dominant impedance. (Also see, U.S. Pat. No. 4,893,071, which is incorporated herein by reference).

Consider a finger, touching the surface of the display screen directly above the center of the array of sensing electrodes 32 above region 302. In this arrangement, the current increase will be proportional to the area of the sensing electrodes covered by the finger. The current attributable to area E 304 of sensing electrode F 305 will flow to node G 306, while the current attributable to area H 303 on sensing electrode I 307 will flow to node J 308. For node G 306, the current flowing into this node from sensing electrode F 305 is equal to the sum of the currents flowing away from it towards nodes A 36 and B 39. Since node C 306 is located approximately equidistant from nodes A 36 and B 39; the measured current flowing into node A 36 at the end of the resistor string is balanced by the measured current flowing into node B 39 at the other end of the resistor string. Similarly, for node J 308, since it is also located equidistant from nodes C 38 and D 37 the measured current flowing into node C 38 is balanced by the measured current flowing into node D 37. The current variation with finger position is linear in each direction such that the Y-axis position is given by $$Y = \frac{Ia + Id}{Ia + Ib + Ic + Id} \quad (1)$$

while the X-axis position of the touch is given by $$X = \frac{Id + Ic}{Ia + Ib + Ic + Id} \quad (2)$$

Calculation of the X and Y location of the finger would then show that it is centered in the middle of the display, as expected.

Assume the same finger is placed on the surface of the display screen directly above touch region 301. The current attributable to area K 310 on sensing electrode L 311 will flow to node O 312 and the current attributable to area M 313 on sensing electrode N 314 will flow to node P 315. Area K 310 is much larger than area M 313, so the current flowing to node O 312 will be larger than the current flowing to node P 315, which is determinative of the location of the object relative to the center of the array of sensing electrodes. For node O 312, the current flowing from sensing electrode L 311 is equal to the sum of the currents flowing towards nodes C 38 and D 37. Since node O 312 is closer to node D 37 than to node C 38 the current flowing into node D 37 at one end of the resistor string is larger than the current flowing into node C 38 at the other end of the resistor string. For node P 315 the current flowing from sensing electrode N 314 is equal to the sum of the currents flowing into nodes A 36 and B 39 from the resistor string. For the same reason as for node D 37, the current flowing into node A 36 will be larger than the current flowing into node B 39 from the resistor string.

Several other finger proximity sensing methods can be used as well. The electrodes and resistive strings could be replaced by a continuous resistive sheet with rf drive and current sensing structure implemented at the corners. (See U.S. Pat. No. 5,337,353 which is incorporated herein by reference.) However, such a structure would also require complicated correction circuitry to correct inherent non-linearity's. Another method for finger touch is "finger mouse", described in U.S. patent application Ser. No. 08/011,040 which is incorporated herein by reference. The "finger mouse" method is also based on an electrode structure, however it is less suitable, since the electrodes are not easily formed by modifying an existing liquid crystal display layer and would also require two level wiring, to implement current sensing.

The central advantage of the triangular patterned touch sensor is the single electrode level and wiring design, that makes it suitable for inclusion within a liquid crystal display.

Figure 4A:
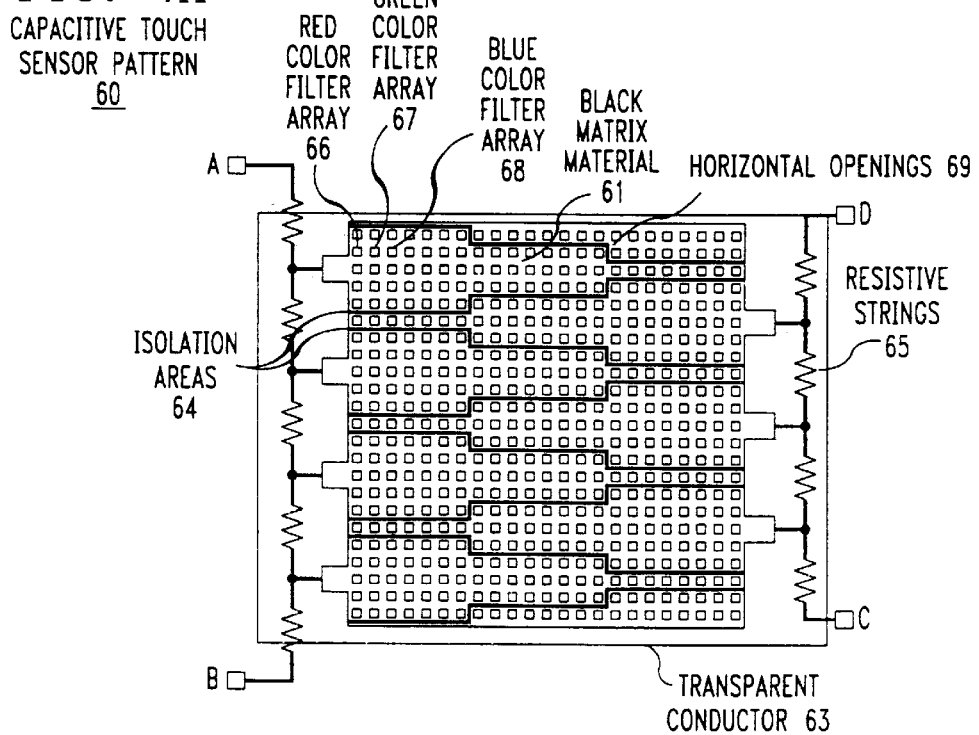
FIG. 4A shows a schematic illustration of a capacitive touch sensor pattern and resistive strings in the black matrix layer of a liquid crystal display.
Figure 4B:
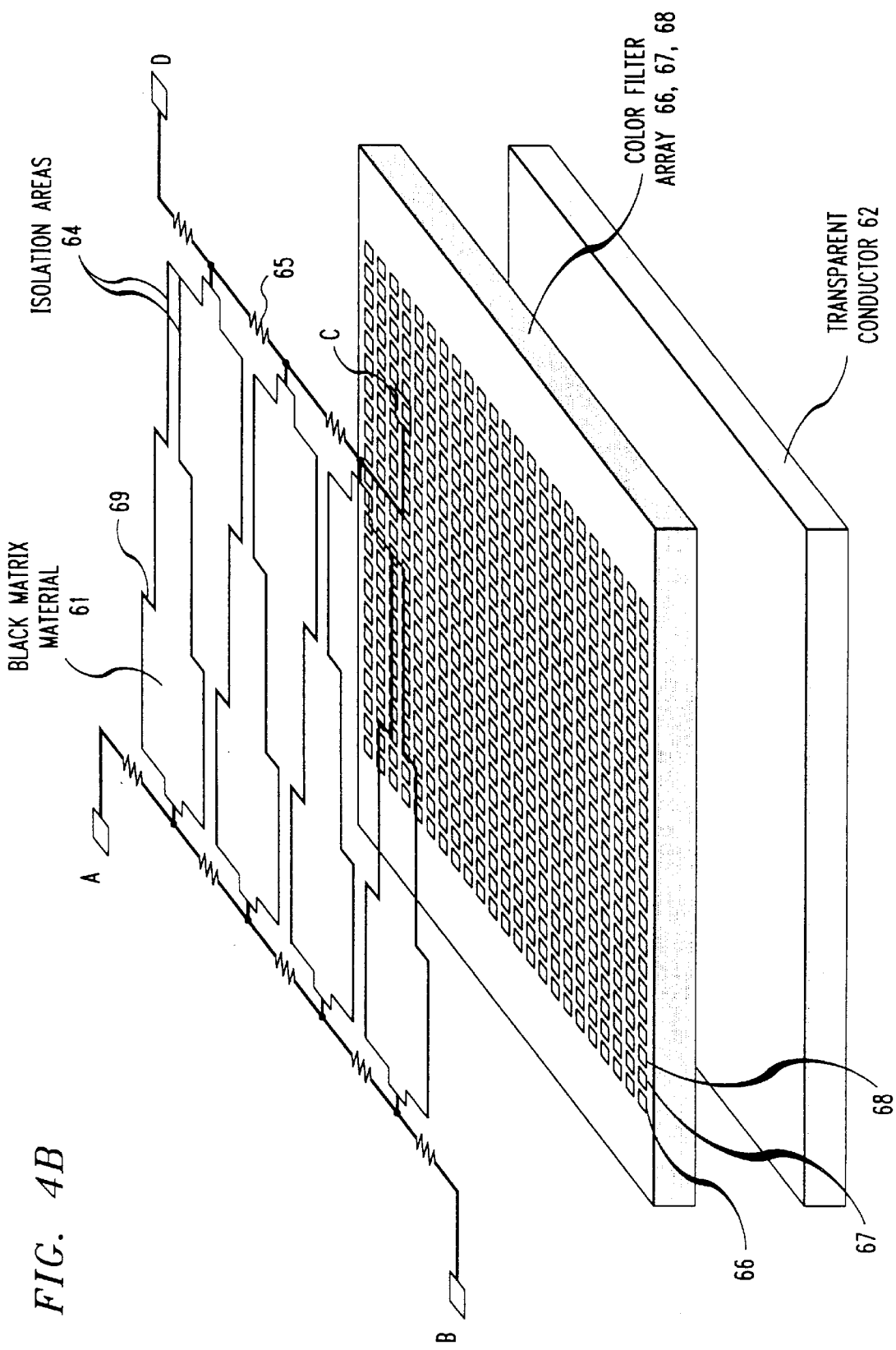
FIG. 4B is a perspective view of these same layers which comprise the capacitor touch sensor pattern and resistive strings in the black matrix layer of a liquid crystal display.

With reference to FIG. 3A, the version of the invention herein described, uses the capacitive touch sensor pattern 60 of FIGS. 4A and 4B, formed in black matrix material 11 of the liquid crystal display, to sense objects in the proximity of a flat panel display screen. Color filter plate 10 with patterned, conducting black matrix material 11 can be fabricated as follows. First, color filter plate 10 is cleaned and dried. Next, black matrix material 11 is deposited on one surface of the plate, either the interior side of the liquid crystal display, as depicted, or on an outside surface of the liquid crystal display module. Deposition of black matrix material 11 may be accomplished through the use of any conventional deposition technique. Black matrix material 11 is comprised of a stack of different materials, directed to obtaining a low reflectivity, strongly absorptive surface. See U.S. Pat. No. 5,566,011, which is incorporated herein by reference. For example, multiple layers of Cr and $Cr_2O_3$ will provide these desired characteristics. A film stack can also be chosen such that the top layer is left conducting, such as with a layer of chromium. Alternatively, if the top layer is insulating, it may be deposited with a shadow mask or later patterned to enable electrical contact to the conducting part of the black matrix. After black matrix material 11 is deposited, it is patterned using standard photolithographic techniques. (See D. A. McGillis, "Lithography", in S. M. Sze, Ed., VLSI Technology, McGraw-Hill, New York, 1983). Material patterning is well understood in the art, involving, for example, deposition and lithographic exposure of a resist layer, followed by either a plasma or wet etch step where the pattern is transferred through the layers of black matrix material 11.

Referring to FIG. 4A a schematic illustration of the top view of capacitive touch sensor pattern 60 fabricated in black matrix material 61, as described above, is shown. FIG. 4B is a perspective view of these same layers which comprise the capacitive touch sensor pattern and resistive strings in the black matrix layer of a liquid crystal display. In FIGS. 4A and 4B, black matrix material 61 and color filter array 66, 67 and 68 (if needed) are superimposed over transparent conductor 62. Capacitive touch sensor pattern 60 is shaped by a series of isolation areas 64, created in the black matrix material 61 using conventional photolithography and etching. Only a few segments of the touch sensor are shown in FIGS. 4A and 4B. Resistive strings 65 located in a peripheral area of black matrix material 61, are made at the same time the entire black matrix material layer is patterned, in a one step process. Positions A, B, C, and D, correspond to the same letters as in the capacitive touch sensor of FIG. 3B.

To implement isolation areas 64 of FIGS. 4A and 4B, the black matrix mask is modified to define a conducting strip pattern that constitutes the digitizer as well as the current dividing resistors. This is achieved by etching, in the conducting black matrix layers, a series of thin (typically 5–15 $\mu$m wide), serpentine patterns (typically 100–300 $\mu$m long), and which are represented by the solid black lines labeled isolation areas 64. Additionally, the location of isolation areas 64, in black matrix material 61 may be adjusted so as not to unacceptably interfere with the operation of the other liquid crystal display layers, located below. For example, with reference to the capacitive sensor pattern shown in FIG. 4A, alignment of black matrix material 61 with the underlying active matrix plate 25 (FIG. 2), is important if light is not to leak through isolation areas 64. For this reason the horizontal openings 69, of isolation areas 64, should be positioned directly above the gate or row lines of the transistors on active matrix plate 25. Corresponding vertical openings of isolation areas 64 should likewise be positioned directly above the data or column lines on active matrix plate 25. Typically, column lines on active matrix plate 25 are narrower than row lines, so that the alignment precision required, is dictated by the dimensions of the column lines. For example, if the column lines are only 10 $\mu$m wide and isolation areas 64 are 3 $\mu$m wide, the alignment tolerance must be better than ±3.5 $\mu$m in order to avoid light leakage.

Figure 5A:
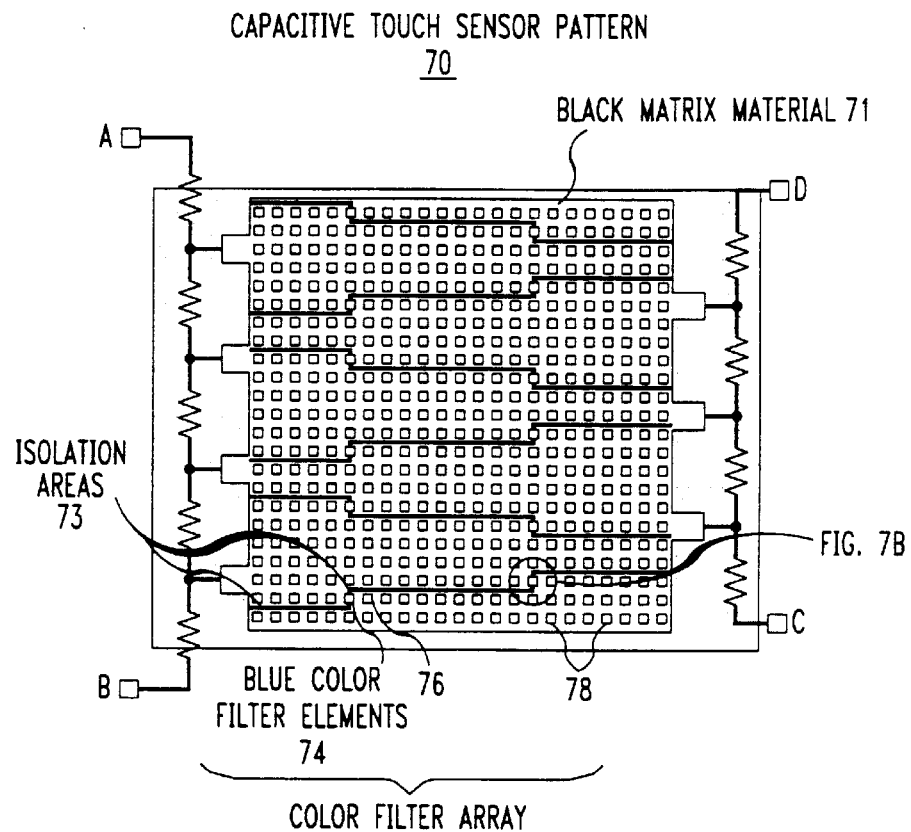
FIG. 5A shows an alternative capacitive touch sensor pattern with resistive strings in the black matrix layer of a liquid crystal display.
Figure 5B:
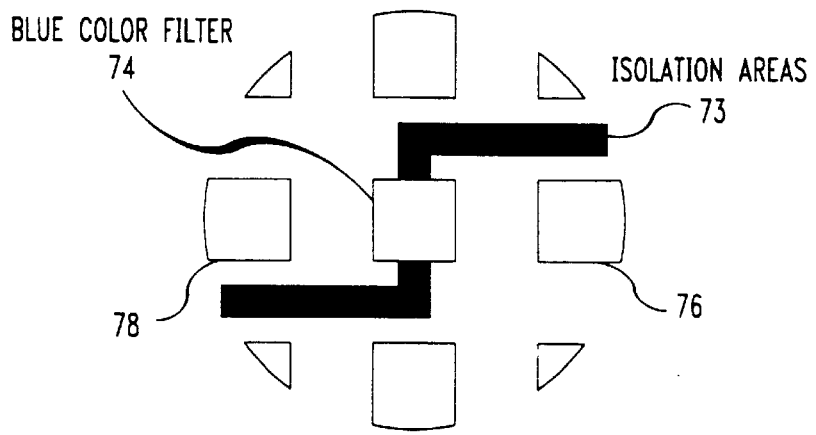
FIG. 5B is an enlargement of a black matrix cut superimposed over the blue color filter array element.

One means of relaxing the alignment constraints between black matrix material 11 and active matrix plate 25, is shown in FIGS. 5A and 5C. In this embodiment, blue color filter elements 74 of color filter array 72 can be used for vertical isolation in black matrix material 71. The alignment of a horizontal section of isolation area 73 to a blue color filter element 74 is depicted in FIG. 5B. By using blue color filter elements 74, openings in only horizontal sections of black matrix material 71, need be made. Since the row lines of active matrix plate 25, are typically much wider then column lines, such a configuration relaxes isolation area 73 alignment constraints. Blue color filter elements 74 of color filter array 72 are also used for isolation to further minimize effects of misalignment and light leakage. Since the human eye is less sensitive to blue, any light leakage will go largely unnoticed.

Referring again to FIGS. 4A and 4B, once conducting black matrix material 61 has been appropriately patterned, the color filter array materials 66, 67 and 68 are sequentially deposited and patterned using conventional materials and photolithography. For example, a red-pigmented resist is spun onto the color filter plate containing black matrix material 61. If the red-pigmented resist is photosensitive, it can be patterned, as deposited. Otherwise, a photosensitive material is applied to transfer the red filter array element 66 pattern to the underlying pigmented material, and form the red component of the filter array. This process is repeated two more times—once each for green and blue filters. The light shielding by color filter array materials 66, 67 and 68, requires an optical density of at least 2.0. Color filter array materials 66, 67 and 68 are easily removed from the periphery of conducting black matrix material 61, to enable subsequent electrical contact. Next, planarization layer 13, an overcoat of polyimide or like material, is applied to seal and provide a flat surface above color filter array material 66, 67 and 68. Planarization layer 13 can be printed and again the periphery of conducting black matrix material 61 can be left exposed.

Finally referring to FIG. 2, a blanket film of transparent conductor 14, such as indium tin oxide (ITO) is deposited on top of planarization layer 13. The term transparent does not require 100% optical transmission. Transparency sufficient to render visible, liquid crystal display images is the only requirement. For purposes of the present invention, materials which are nonconductive to light generally transmit less than 0.1% and possess an optical density of 3.0. A shadow mask can be used during the deposition process to prevent deposition of transparent conductor 14 on conducting black matrix material 61 (FIG. 4A). In this way, separate contacts 21, 22 can be made to each layer.

Contact 22 to transparent conductor 14, which serves as both the guard plane for the capacitive touch sensor and the common electrode for the liquid crystal display, is achieved by using a dot of conducting epoxy to contact active matrix plate 25, containing the array of thin film transistors. Similarly, contact to the four node pads A, B, C, and D of the black matrix digitizer can be made through leads connecting each node pad to active matrix plate 25. Alternatively, the current sensing electronics may be attached directly on the color filter plate 10 using chip-on-glass methods, or flexible, heat-sensitive conducting tape. Alternatively, the current sensing electronics could be fabricated from transistor and capacitor elements used in making the active matrix plate 25.

Figure 6:
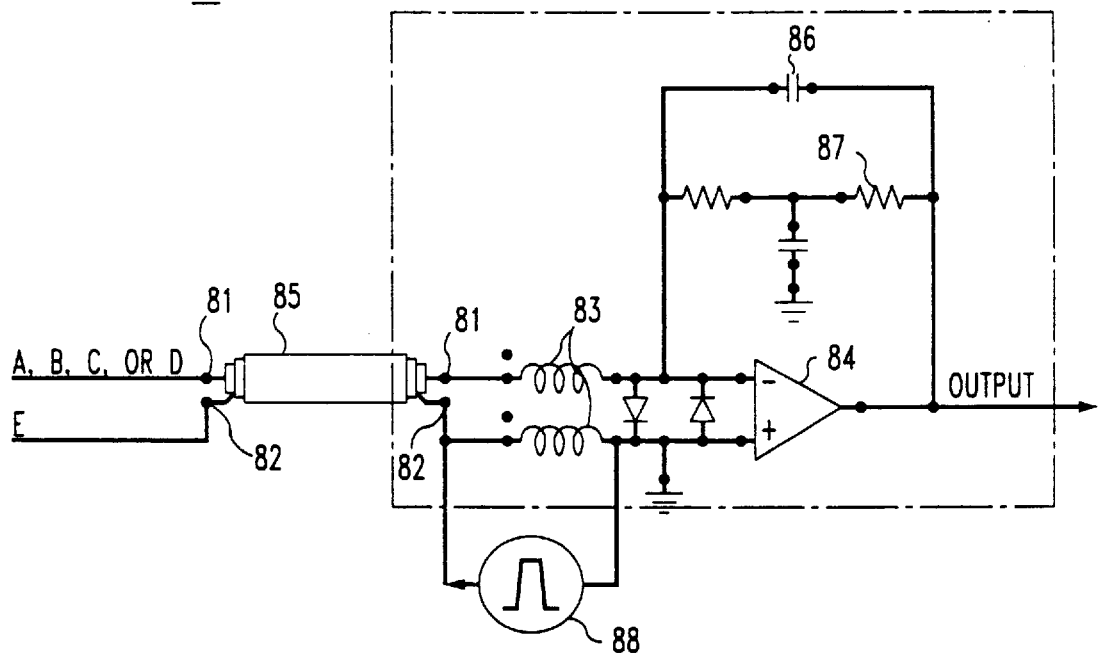
FIG. 6 depicts a current amplifier used to sense the currents at each of the nodes A, B, C, and D as indicated in FIGS. 4A & 5A.

A variety of methods may be used to sense the currents flowing to the four nodes A, B, C, and D of the capacitive touch sensor. One such method is shown in FIG. 6. See U.S. Pat. No. 5,337,353, which is incorporated herein by reference. FIG. 6 shows a current amplification circuit 80 which can be used to sense the currents at each of the nodes A, B, C, or D. Black matrix contact pads 81 at each of the nodes A, B, C and D as well as common/guard plane contact pad 82 are connected through a shielded cable 85, to transformer 83. Voltage source 88 drives the shield of cable 85 directly, so that the sensing electrode and guard electrode are driven in unison through transformer 83. One terminal of transformer 83 is connected to a black matrix node A, B, C, or D, and the other end is connected to an input of amplifier 84 which, together with capacitor 86 and resistors 87, operates as an integrator. The outputs from each current amplification circuit, for each of the nodes A, B, C, and D are then multiplied with a reference signal from a pulse generator, not shown. This synchronization with the applied voltage waveform serves to filter the signal with respect to noise.

Figure 7:
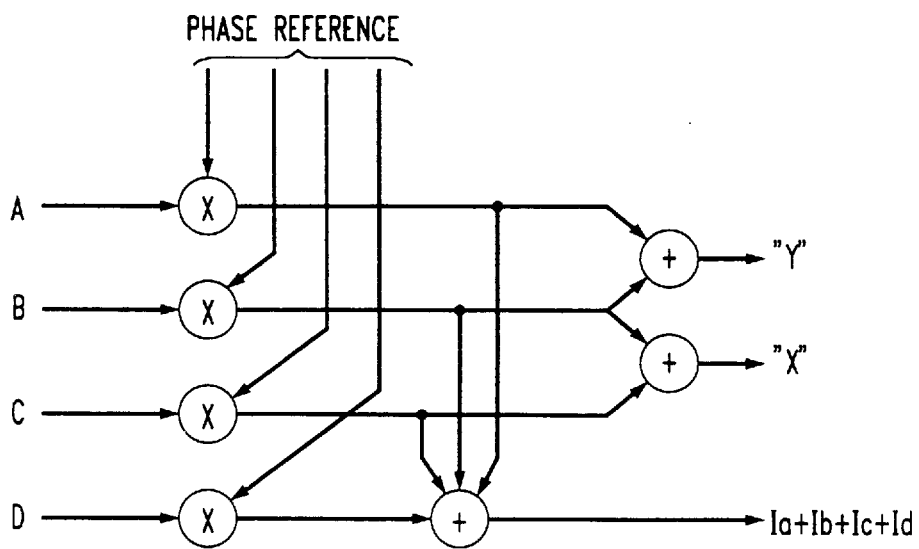
FIG. 7 illustrates the phase locking and summing of amplified currents from the black matrix layer of the liquid crystal display.

Finally, output currents from nodes A, B, C, and D are phase locked and summed as shown in FIG. 7 and the coordinates of the touched position are determined. The X-axis and Y-axis outputs along with the total currents generated from this circuit are used to calculate the normalized position of the object in contact with the flat panel display screen, according to equations (1) and (2).

It will be readily appreciated by those skilled in the art that other liquid crystal display module elements of the liquid crystal display module could be similarly modified to incorporate a capacitive touch sensor pattern. For example, a patterned layer of ITO material placed on an outer surface of the color filter plate provides higher signal-to-noise performance for the digitizer by placing the sensing electrodes further away from the guard electrode. The distance between the sensing electrodes and guard electrodes is about 1–2 microns, when the black matrix material is patterned for sensing pen or finger input, whereas, the placement of a patterned ITO layer on the outside surface of the liquid crystal display module increases this separation to 1 millimeter. Also, the guard electrode could be split into rows and the black matrix layer into columns so that an active pen would detect input on the display screen.

The invention claimed is:

1. A liquid crystal display comprising:
    a display screen;
    an active matrix plate spaced apart from the display screen wherein the active matrix plate has a plurality of switching elements connected to an array of thin film transistors formed thereon;
    a color filter plate positioned between the display screen and the active matrix plate wherein the color filter plate has a layer of black matrix material formed on a surface thereof; and
    a transparent conductive layer positioned between the active matrix plate and the color filter plate wherein the layer of black matrix material and the transparent conductive layer are adapted to sense the location of an object touching the display screen based upon the relative size of the displacement current generated at the point of contact between the object and the display screen.

2. The liquid crystal display of claim 1 wherein the object is a finger.

3. The liquid crystal display of claim 1 wherein the object is a stylus.

4. The liquid crystal display of claim 1 wherein the layer of black matrix material is patterned into a plurality of strips of conducting material which are separated from each other by a plurality of isolation areas.

5. The liquid crystal display of claim 1 wherein the plurality of switching elements are adapted to have a plurality of gate lines and a plurality of row lines and wherein at least one of the plurality of isolation areas are aligned to one of the plurality of gate lines and the plurality of row lines of the plurality of switching elements on the active matrix plate.

6. The liquid crystal display of claim 4 wherein the layer of black matrix material is further patterned to have a plurality of resistive strings and a plurality of contact pads.

7. The liquid crystal display of claim 4 wherein at least one of the isolation areas is non-continuous.

8. The liquid crystal display of claim 7 further comprising a color filter array having a red filter, a blue filter and a green filter, wherein the at least one isolation area that is non-continuous is aligned to the blue filter of the color filter array.

9. A method of sensing the location of an object touching a surface portion of a display screen of a liquid crystal display comprising the steps of:
    applying a signal to a black matrix layer of a liquid crystal display wherein the black matrix layer is patterned into a plurality of stripes of conducting material which are separated from each other by a plurality of isolation areas, and wherein the signal generates a current in the black matrix layer; and
    generating a displacement current in response to an object touching a portion of a display screen of the liquid crystal display wherein the black matrix layer and a transparent conductive layer of the liquid crystal display sense the location of the object touching the display screen based upon the relative size of the displacement current generated at the point of contact between the object and the display screen.

10. The method of claim 9 wherein the object is a stylus.

11. The method of claim 9 wherein the object is a finger.

12. The method of claim 9 further comprising applying the signal to a transparent conductor of the liquid crystal display.

13. A method of sensing the location of an object touching a surface portion of a display screen of a liquid crystal display comprising the steps of:
    applying a signal to a black matrix layer and a transparent conductor of a liquid crystal display wherein the black matrix layer is patterned into a plurality of strips of conducting material which are separated from each other by a plurality of isolation areas, and wherein the signal generates a current in the black matrix layer; and
    generating a displacement current in response to an object touching a portion of a display screen of the liquid crystal display wherein the black matrix layer and the transparent conductive layer of the liquid crystal display sense the location of the object touching the display screen based upon the relative size of the displacement current generated at the point of contact between the object and the display screen.

* * * * *